United States Patent
Hu et al.

(10) Patent No.: US 12,218,767 B2
(45) Date of Patent: Feb. 4, 2025

(54) SYSTEMS, METHODS, AND DEVICES FOR HARQ MANAGEMENT IN NON-TERRESTRIAL NETWORKS

(71) Applicant: Apple Inc., Cupertino, CA (US)

(72) Inventors: Haijing Hu, Los Gatos, CA (US);
Sarma V Vangala, Campbell, CA (US);
Alexander Sirotkin, Hod Hasharon (IL); Chunxuan Ye, San Diego, CA (US); Dawei Zhang, Saratoga, CA (US); Fangli Xu, Beijing (CN); Naveen Kumar R Palle Venkata, San Diego, CA (US); Pavan Nuggehalli, San Carlos, CA (US); Ralf Rossbach, Munich (DE); Sethuraman Gurumoorthy, San Ramon, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/773,146

(22) PCT Filed: Aug. 5, 2021

(86) PCT No.: PCT/CN2021/111055
§ 371 (c)(1),
(2) Date: Apr. 29, 2022

(87) PCT Pub. No.: WO2023/010489
PCT Pub. Date: Feb. 9, 2023

(65) Prior Publication Data
US 2024/0187145 A1    Jun. 6, 2024

(51) Int. Cl.
*H04L 1/1829* (2023.01)
*H04L 1/1825* (2023.01)
*H04W 84/06* (2009.01)

(52) U.S. Cl.
CPC .......... *H04L 1/1864* (2013.01); *H04L 1/1825* (2013.01); *H04W 84/06* (2013.01)

(58) Field of Classification Search
CPC ..... H04L 1/1825; H04L 1/1864; H04W 84/06
See application file for complete search history.

(56) References Cited

U.S. PATENT DOCUMENTS

2019/0363843 A1\* 11/2019 Gordaychik ........ H04W 72/044
2022/0038243 A1\* 2/2022 Shrestha .................. H04L 1/188
(Continued)

FOREIGN PATENT DOCUMENTS

| CN | 110301110 A | 10/2019 |
| CN | 111756480 A | 10/2020 |

(Continued)

OTHER PUBLICATIONS

3GPP TSG-RAN WG2#106, R2-1907441 Title: Correction on QoS flow remapping to default DRB (Alternative 2) (Year: 2019).\*

(Continued)

*Primary Examiner* — Faruk Hamza
*Assistant Examiner* — Abusayeed M Haque
(74) *Attorney, Agent, or Firm* — Eschweiler & Potashnik, LLC

(57) ABSTRACT

Techniques, described herein, include solutions for managing hybrid automatic repeat request (HARQ) processes and communications for non-terrestrial networks (NTNs) (e.g., a wireless communication network that includes a satellite network component). A user equipment (UE) may connect to an NTN and determine hybrid automatic repeat request (HARQ) capabilities regarding NTNs. The UE may also communicate a HARQ disablement message to the NTN and communicate with NTN without HARQ procedures. The HARQ disablement message may provide the HARQ disablement capabilities of the UE and/or be a request for the (Continued)

network to disable HARQ. The HARQ disablement message may include a radio resource control (RRC) reconfiguration message and may address HARQ disablement per logical channel identifier (LCID) or dedicated radio bearer (DRB).

20 Claims, 9 Drawing Sheets

(56) References Cited

U.S. PATENT DOCUMENTS

| | | | | |
|---|---|---|---|---|
| 2022/0158770 A1* | 5/2022 | Hong | .................... | H04L 5/0091 |
| 2022/0166536 A1* | 5/2022 | Ma | ........................ | H04L 1/1819 |
| 2022/0286235 A1* | 9/2022 | Ranta-Aho | ........... | H04L 1/1887 |
| 2022/0322131 A1* | 10/2022 | Shrestha | ................. | H04L 69/10 |
| 2023/0239820 A1* | 7/2023 | Han | .................... | H04B 7/1851 |
| | | | | 370/350 |

FOREIGN PATENT DOCUMENTS

| | | |
|---|---|---|
| WO | 2018064615 A1 | 4/2018 |
| WO | 2020205395 A2 | 10/2020 |
| WO | 2021018221 A1 | 2/2021 |

OTHER PUBLICATIONS

3GPP TSG-RAN WG1 Meeting#93, R1-1807791 Title: Chairman's note of AI 7.6 Study on NR-based Access to unlicensed Spectrum (Year: 2018).*
PCT Search Report dated Apr. 18, 2022 in connection with PCT Application No. PCT/CN2021/111055.
PCT Written Opinion dated Apr. 21, 2022 in connection with PCT Application No. PCT/CN2021/111055.
Qualcomm Incorporated; "Enhancements on HARQ for NTN"; 3GPP TSG RAN WG1 #102-e; R1-2006806; Aug. 28, 2020.
International Preliminary Report on Patentability dated Feb. 6, 2024 in connection with PCT Application No. PCT/CN2021/111055.

* cited by examiner

| | | | | | | | | |
|---|---|---|---|---|---|---|---|---|
| LCG0 | LCG1 | LCG2 | LCG3 | LCG4 | LCG5 | LCG6 | LCG7 | OCT 1 |
| 0/1 | 0/1 | 0/1 | 0/1 | 0/1 | 0/1 | 0/1 | 0/1 | OCT 2 |

LCID FOR UL-SCH

| | | | | | | | | |
|---|---|---|---|---|---|---|---|---|
| LCG0 | LCG1 | LCG2 | LCG3 | LCG4 | LCG5 | LCG6 | LCG7 | OCT 1 |
| 0/1 | 0/1 | 0/1 | 0/1 | 0/1 | 0/1 | 0/1 | 0/1 | OCT 2 |

LCID FOR DL-SCH (0/1 INDICATES DISABLED (0) / ENABLED (1) HARQ FEEDBACK)

*FIG. 6*

SYSTEMS, METHODS, AND DEVICES FOR HARQ MANAGEMENT IN NON-TERRESTRIAL NETWORKS

This application is a National Phase entry application of International Patent Application No. PCT/CN2021/111055 filed Aug. 5, 2021, entitled "SYSTEMS, METHODS, AND DEVICES FOR HARQ MANAGEMENT IN NON-TERRESTRIAL NETWORKS", the contents of which are herein incorporated by reference in their entirety.

FIELD

This disclosure relates to wireless communication networks including techniques for managing non-terrestrial networks.

BACKGROUND

Wireless communication networks may include user equipment (UEs) (e.g., smartphones, tablet computers, etc.) capable of communicating with base stations and other network nodes. Some types of wireless networks include non-terrestrial networks (NTNs) that involve satellites configured to further enable network devices to communicate with one another. Important aspects of wireless networks include processes and procedures that help ensure information transmitted between devices arrive in a timely and complete manner.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 6 is a diagram of examples of media access control (MAC) control elements (CEs) for indicating, per logical channel identifier (LCID), enablement/disablement for HARQ processes.

DETAILED DESCRIPTION

Figure 1:
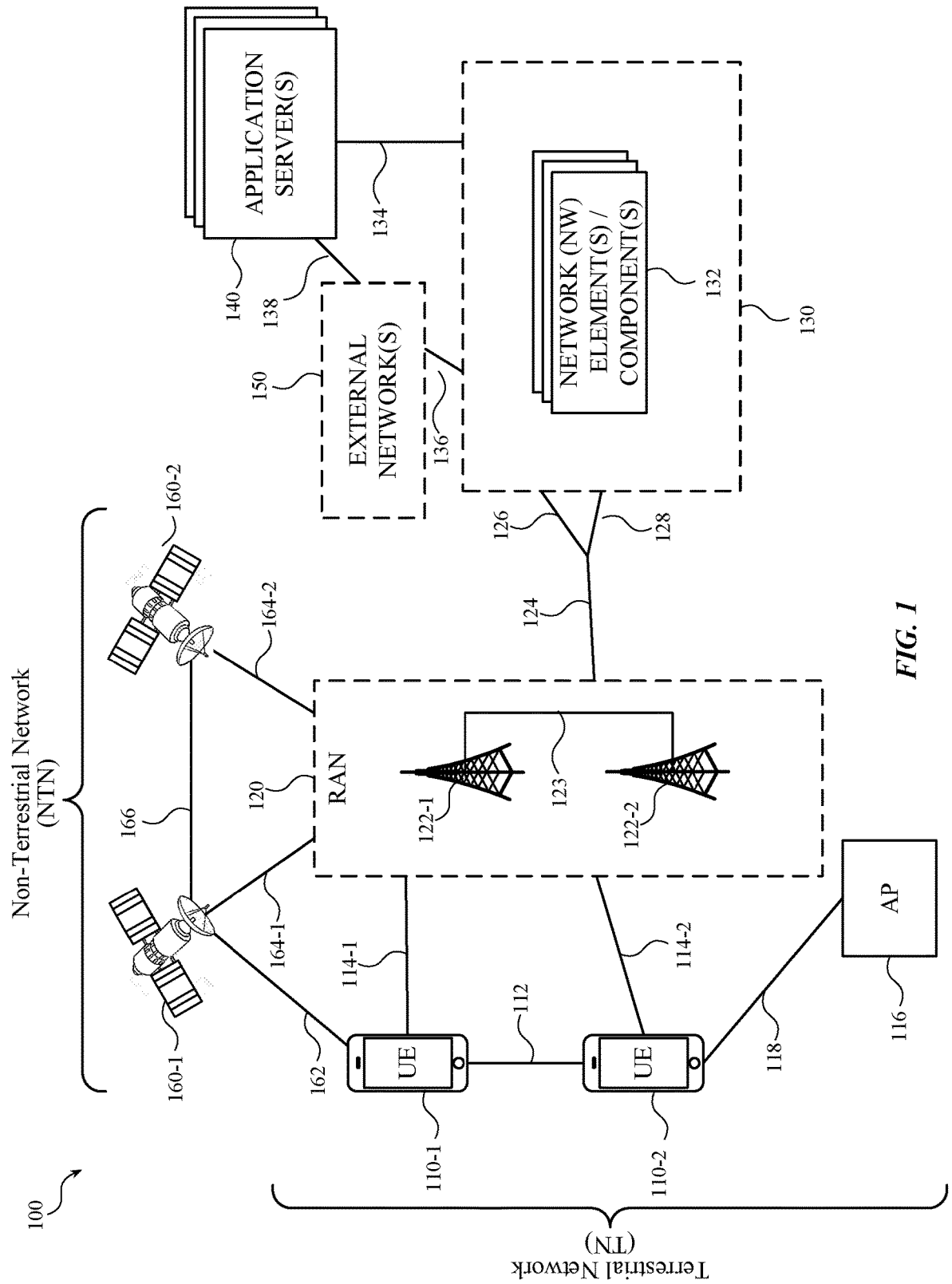
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Some wireless communication networks may include user equipment (UEs) capable of communicating wirelessly with base stations and other network nodes. Non-terrestrial networks (NTNs) may comprise wireless networks that include satellites configured to operate as network components and thereby further enable devices (e.g., UEs, base stations, etc.) to communicate with one another. NTNs may be configured to implement fourth generation (4G) technology, fifth generation (5G) or new radio (NR) technology, sixth generation (6G) technology, and so on. While the use of satellites may create a more dynamic or expansive network, satellites may also increase an amount of power devices use in communicating with one another, an amount of time transmissions and responses may take to travel from a source to a destination, and so on. An aspect of NTNs that may further increase the power and time required for communication may include hybrid automatic repeat request (HARQ) procedures (e.g., HARQ feedback).

A HARQ procedure may include a combination of high-rate forward error correction (FEC) and automatic repeat request (ARQ) error-control techniques. In standard ARQ, redundant bits may be added to data to be transmitted using an error-detecting (ED) code, such as a cyclic redundancy check (CRC). Receivers detecting a corrupted message may request a new message from the sender. In hybrid-ARQ (or HARQ), original data may be encoded with an FEC code, and parity bits may be either immediately sent along with the message or only transmitted upon request when a receiver detects an erroneous message. The FEC code may be chosen to correct an expected subset of errors that may occur, while the ARQ method is used as a fallback to correct errors that are uncorrectable using only the redundancy sent in the initial transmission. Indeed, HARQ procedures may include a feedback component (e.g., HARQ feedback) which may include one or more operations whereby a receiving device determines and indicates whether information from a transmitting device has been successfully received and decoded (resulting in an acknowledgement (ACK) response to the transmitting device) or unsuccessfully received and decoded (resulting in non-acknowledgement (NACK) response to the transmitting device), which can often result in devices waiting for successful transmission, receiving retransmissions, and/or performing other resource-costing processes. As communications within an NTN can inherently tend to use extra power and time to transmit and receive information (e.g., because of the use of satellites), implementing HARQ procedures can result in a further increase in the power and time required for device communications because of the signaling redundancy and verification involved. Meanwhile, the value of HARQ procedures may have diminishing returns in certain situations, or the cost of HARQ procedures may outweigh its benefits. As such, disabling HARQ procedures may be beneficial for at least some communications in an NTN.

In bands and architectures that the 3rd generation partnership project (3GPP) has considered so far, few or no situations were encountered where they impacted HARQ feedback in terms of latencies. Hence, it was up to the network to decide to enable or disable HARQ feedback and therefore, no explicit signaling was specified. NTN is a scenario where having HARQ feedback would impact latency in ways where maintaining quality of service (QoS) and high throughputs may not be possible due to large propagation speeds. The problem with these large latencies is that, in a HARQ enabled scenario, in case of retransmissions, the UE may just be monitoring the channel, waiting for the retransmissions to complete. The network in this case can disable HARQ using the existing implicit mechanism, but due to the large propagation delay associated with NTN networks, the UE may be unaware of disablement of HARQ for a period of time, resulting in significant power penalties associated with channel monitoring (e.g., the power may be linearly related to the amount of time the UE spends in the channel monitoring state). Having a mechanism where the UE can know this information ahead of time and the ability to enable/disable HARQ would immensely benefit power usage at the UE.

Techniques, described herein, may be used to enable/disable HARQ procedures (e.g., HARQ feedback) to increase efficient power usage and transmission efficiency. As described below, a UE may inform the NTN that the UE supports disablement of HARQ for uplink (UL) and/or downlink (DL) transmissions and the NTN may respond by disabling HARQ procedures for the UE. In some scenarios, the UE may proactively send requests to the NTN to disable HARQ for UL and/or DL transmission, and the NTN may respond in various ways to do so. Also described herein are solutions for enabling/disabling HARQ procedures for certain logical channels and/or dedicated radio bearers (DRBs) in NTNs. Further, the techniques described below include one or more media access control (MAC) control elements (CEs), radio resource control (RRC) messages, Information Elements (IEs), and parameters for achieving these benefits and improving NTNs in a meaningful way.

For example, disabling HARQ procedures may enable a UE to know a HARQ feedback state of a particular communication (e.g., without having to wait to determine, by reception or lack thereof, whether an explicit network retransmission request arrives). As such, the techniques described herein provide solutions for enhancing the performance of NTNs to save time, conserve power, and simplify network processes. In some implementations, disabling HARQ, as described herein, may include disabling the entire HARQ procedure. In some implementations, disabling HARQ, as described herein, may include disabling a portion of the HARQ process, such as portions of a HARQ procedure relating to waiting for, or providing, HARQ feedback (e.g., providing an acknowledgement (ACK) and/or negative acknowledgement (NACK).

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IOT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as base stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHZ to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
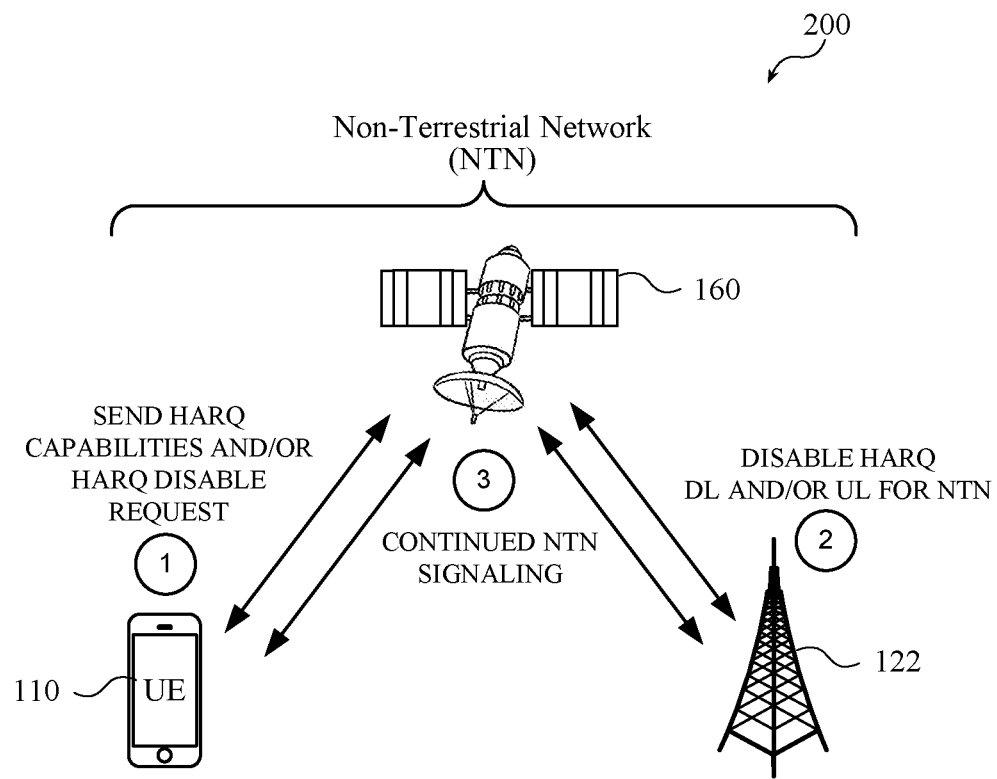
FIG. 2 is a diagram of an example overview of hybrid automatic repeat request (HARQ) management in a non-terrestrial network (NTN).

FIG. 2 is a diagram of an example overview 200 of HARQ management in an NTN. As shown, overview 200 may include UE 110 connected to an NTN comprising a satellite 160 and base station 122. Briefly, UE 110 may send information describing the HARQ capabilities of UE 110 to base station 122 via satellite 160 (at 1). HARQ capabilities, as described herein, may include an indication of whether a particular device (e.g., UE 110) is capable of disabling (and operating without) HARQ procedures. HARQ capabilities may also include an indication of whether the device may enable HARQ procedures. UE 110 may also, or alternatively, communicate a request to the NTN to disable HARQ procedures (also at 1). Satellite 160 may relay this information to base station 122, and base station 122 may respond by disabling HARQ procedures for UL and/or DL communications (at 2). UE 110, satellite 160, and base station 122 may continue signaling one another without encumbrances associated with implementing wasteful or unnecessary HARQ procedures in an NTN environment (at 3).

Figure 3:
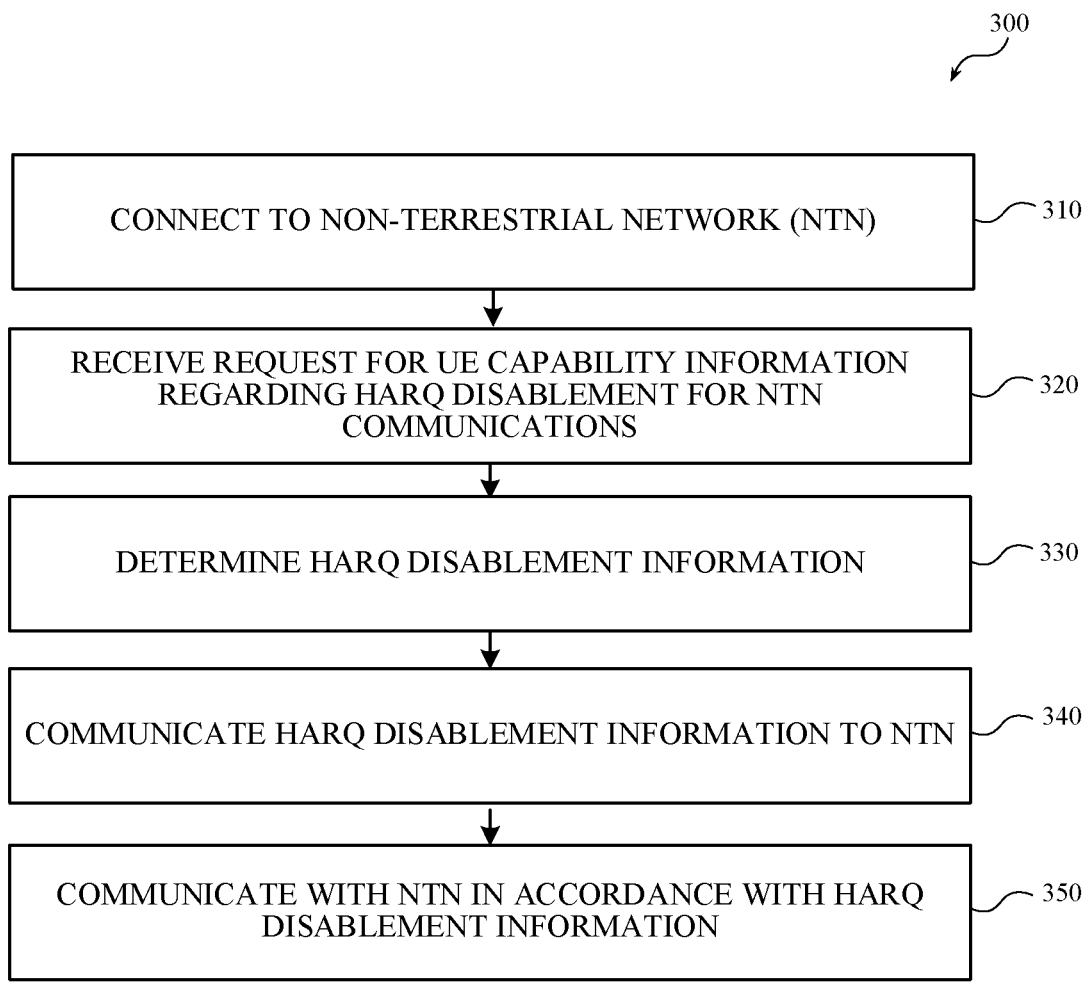
FIG. 3 is a diagram of an example of a process for disabling HARQ signaling in an NTN.

FIG. 3 is a diagram of an example of a process 300 for disabling HARQ signaling in an NTN. Process 300 may be implemented by UE 110. In some implementations, some or all of process 300 may be performed by one or more other systems or devices, including one or more of the devices of FIG. 1, such as base station 122. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., base station 122, satellite 160, etc.).

A shown, process 300 may include connecting to an NTN (block 310). For example, UE 110 may connect to an NTN via satellite 160 and base station 122. In some implementations, satellite 160 may operate as a passive or transparent network relay node regarding communications between UE 110 and base station 122. In some implementations, satellite 160 may operate as an active or regenerative network node such that satellite 160 may operate as a base station to UE 110. As such, references herein to base station 122 may refer to either/both implementations.

Process 300 may include receiving a request for UE capability information regarding HARQ disablement for NTN communications (block 320). For example, UE 110 may receive, from base station 122, a request for information describing abilities, limitations, configurations, etc., of UE 110 relative to the NTN. For example, the request may include an inquiry about whether UE 110 may be configured to support with one or more restrictions regarding the NTN. In a particular example, the request may include a UECapabilityEnquiry message that includes a lcpRestrictionNTN IE with a corresponding value of "true".

Process 300 may include determining HARQ disablement information (block 330). For example, UE 110 may determine whether UE 110 is capable of supporting HARQ restrictions when communicating with the NTN. HARQ disablement information may include whether UE 110 is capable of supporting HARQ disablement in general, whether UE is capable of supporting HARQ disablement regarding DL communications, UL communications, one or more logical channels, one or more dedicated radio bearers (DRBs), etc., and/or any combination thereof. In some implementations, UE 110 may make this determination based on one or more factors, including HARQ NTN default settings, a type of communication UE 110 may be sending/receiving from the NTN, a QoS, a frequency of communication, a network congestion level, a transmission/reception time measured within the NTN, etc.

Process 300 may also include communicating HARQ disablement information to the NTN (block 340). For example, UE 110 may transmit a message to base station 122, indicating whether UE 110 supports HARQ disablement regarding the NTN. In some implementations, the HARQ disablement information may also include an indication of whether UE 110 supports disablement of HARQ DL, and disablement HARQ UL, HARQ disablement regarding one or more logical channels, dedicated resource bearers, etc. As described herein, UE 110 may provide this information via one or more MAC CEs, one or more RRC messages, etc. For example, UE 110 may provide the NTN with a UE-NR-Capability message that includes a lcp-Restriction-NTN IE with a corresponding value of "support". The message may also include a harq-disable-supported-DL IE with a value of "support" and a harq-disable-supported-UL IE with a value of "support." In some implementations, providing base station 122 with this information may cause disablement of HARQ DL and disablement HARQ UL for UE 110 within the NTN.

NTNs, though part of NR, may be an alternate RAT due to the physical layer characteristics of the non-terrestrial channels including propagation delay. Hence treating NTNs as a separate RAT (e.g., with precedence set by other agreements of additional SIBs and network indications) is useful. Additionally, the lcp-restriction parameter designed for a typical RAT (a non-NTN) has been designed for Ultra-Reliable Low-Latency Communication (URLLC) and industrial IoT traffic. Support of this parameter for NTN implies that URLLC/IIOT needs to be supported on NTN which is not possible due to the high propagation delay. So having a separate parameter, e.g., a lcp-Restriction-NTN, may be useful.

Process 300 may also include communicating with the NTN in accordance with the HARQ disablement information (block 350). For example, upon providing base station 122 the HARQ disablement information, UE 110 may proceed to communicate with the NTN without implementing HARQ procedures (which may include or be limited to prohibiting HARQ feedback) for communications in the DL direction and/or UL direction. In some implementations, this may include UE 110 receiving a message (e.g., an RRC Reconfiguration message) from base station 122 about HARQ disablement (e.g., whether HARQ is disabled for DL communications, whether HARQ is disabled for UL communications, whether HARQ is disabled for one or more logical channels, whether HARQ is disabled for DL communications, DRBs, etc., and/or any combination thereof. As such, the techniques described herein may provide solutions for HARQ DL and/or HARQ UL disablement, such that UE 110 may communicate with NTN in a faster and/or more power-efficient manner.

Figure 4:
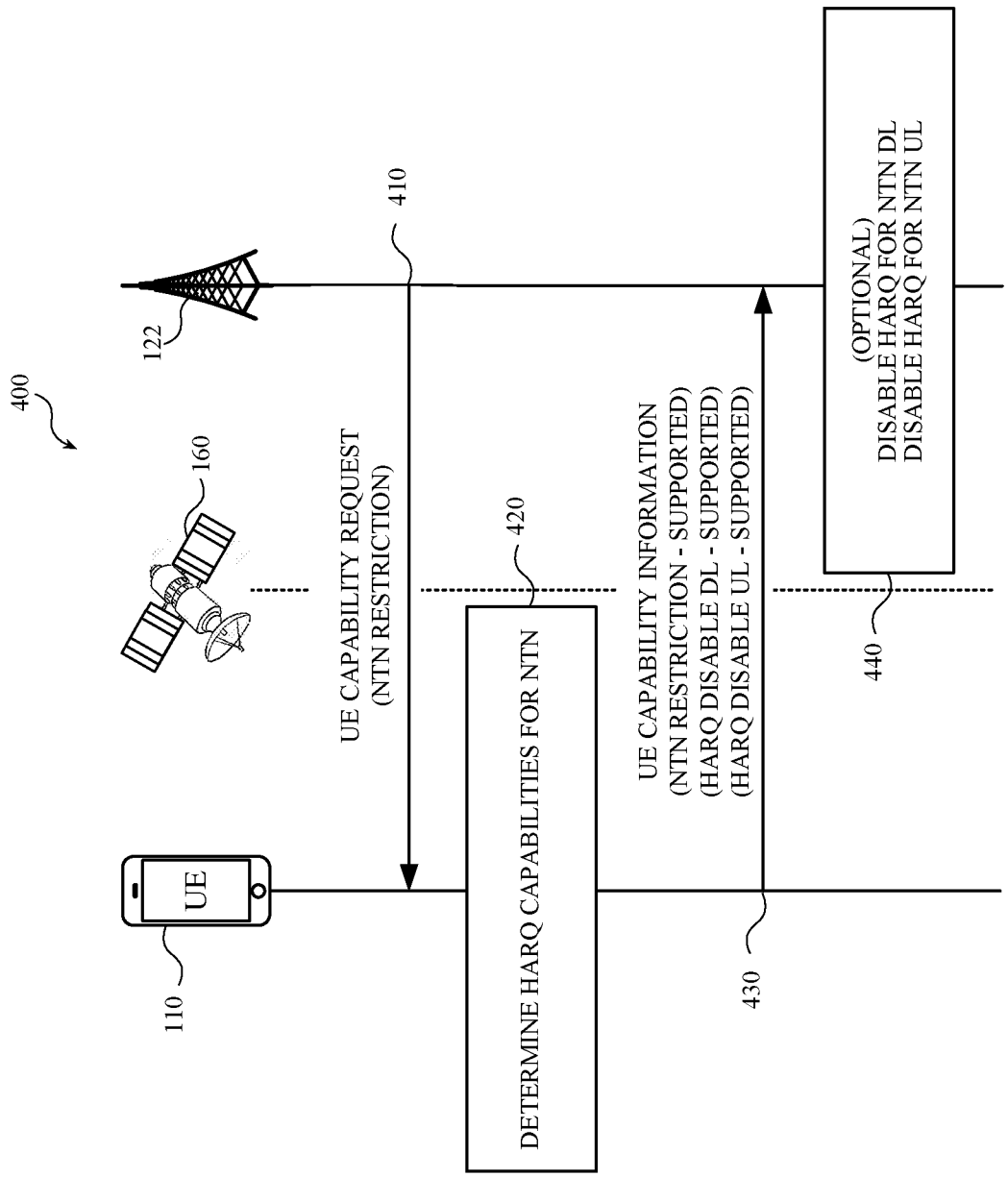
FIG. 4 is a diagram of an example of a process for providing user equipment (UE) capabilities regarding HARQ feedback disablement.

FIG. 4 is a diagram of an example of a process 400 for providing UE capabilities regarding HARQ feedback disablement. As shown, example 400 includes UE 110, base station 122, and satellite 160. In some implementations, some or all of example 400 may be performed by one or more other systems or devices, including one or more of the devices of FIG. 1. Additionally, example 400 may include one or more fewer, additional, differently ordered and/or arranged operations than those shown in FIG. 4. In some implementations, some or all of the operations of example 400 may be performed independently, successively, simultaneously, etc., of one or more of the other operations of example 400. As such, the techniques described herein are not limited to a number, sequence, arrangement, timing, etc., of the operations or process depicted in FIG. 4.

As shown, base station 122 may communicate a UE capability request, regarding NTN restrictions, to UE 110 (at 410). The request may include a UE Capability Information message with one or more IE. In some implementations, the message may include a UE Capability Enquiry message. The message may include a lcp-Restriction-NTN IE with a value of "true." This may indicate that the NTN supports NTN restrictions, such as HARQ DL and/or HARQ UL disablement.

UE 110 may determine the HARQ capabilities of UE 110 regarding the NTN (at 420). UE 110 may determine this based on one or more factors, including UE configuration and/or capability information stored by UE 110, a type of connection between UE 110 and the NTN, an NTN type, a type of information that UE 110 intends send/receive to the NTN, etc. UE 110 may communicate UE capability information to base station 122 (at 430). The UE capability information may include a UE-NR-Capability message or a UECapability Information message. The message may include a MAC parameter of lcp-Restriction-NTN indicating a value of "supported." This may imply or indicate that HARQ feedback disablement is possible.

In some implementations, the UE capability information may also, or alternatively, include a harq-disablement-supported-DL, with a value of "supported," which may cause or enable the NTN to configure DL HARQ disablement for UE 110. Additionally, or alternatively, the UE capability information may also, or alternatively, include a harq-disablement-supported-UL, with a value of "supported," which may inform the NTN that UE 110 is capable of HARQ UL disablement. In response to receiving the UE capability information, base station 122 may proceed to disable HARQ DL and/or HARQ UL for UE 110 (at 440). While not shown in FIG. 4, base station 122 may notify of the HARQ DL and/or UL disablement.

Figure 5:
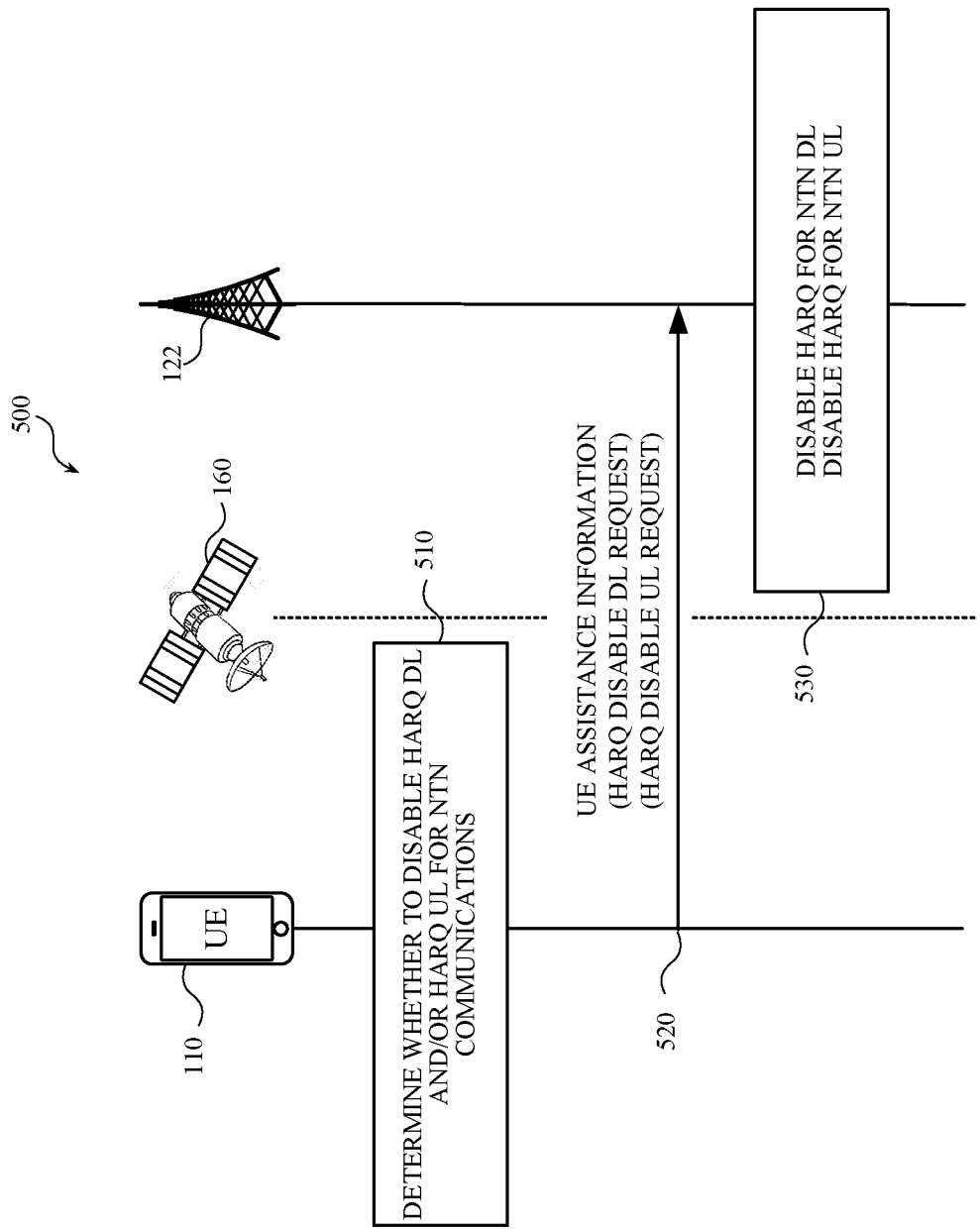
FIG. 5 is a diagram of an example of a process for requesting HARQ disablement in an NTN.

FIG. 5 is a diagram of an example 500 of a process for requesting HARQ disablement in an NTN. As shown, example 500 includes UE 110, base station 122, and satellite 160. In some implementations, some or all of example 500 may be performed by one or more other systems or devices, including one or more of the devices of FIG. 1. Additionally, example 500 may include one or more fewer, additional, differently ordered and/or arranged operations than those shown in FIG. 5. In some implementations, some or all of the operations of example 500 may be performed independently, successively, simultaneously, etc., of one or more of the other operations of example 500. As such, the techniques described herein are not limited to a number, sequence, arrangement, timing, etc., of the operations or process depicted in FIG. 5.

As shown, UE 110 determine whether to disable HARQ DL and/or HARQ UL for NTN communications (at 510). In some implementations, UE 110 may determine whether to disable HARQ DL and/or HARQ UL based on one or more of a variety of factors, such as HARQ NTN default settings stored by UE 110, a type of communication UE 110 may be sending/receiving from the NTN, a QoS, a frequency of communication, a network congestion level, a transmission/reception time measured within the NTN, etc.

UE 110 may communicate UE assistance information to base station 122 (at 520). The US assistance information may include a UEAssistanceInformation message. In some implementations, the UE assistance information may include a request for HARQ DL disablement. In some implementations, this request may include a harq-disablement-DL-Request IE, which may indicate a particular DRB (via a "forDRBId" value). Additionally, or alternatively, the UE assistance information may include a request for HARQ UL disablement. In some implementations, this request may include a harq-disablement-UL-Request IE, which may indicate a particular DRB (via a "forDRBId" value). As such, UE 110 may send UE assistance information to request HARQ DL disablement and/or HARQ UL disablement from base station 122. While not shown in FIG. 5, in some implementations, base station 122 may limit the number of such requests (e.g., UE assistance information requests) from UE 110 by implementing a prohibit timer, imposing for example a maximum threshold of requests from UE 110 over a selected duration. In response to receiving the UE assistance information, base station 122 may proceed to disable HARQ DL and/or HARQ UL for UE 110 (at 530).

While not shown in FIG. 5, base station 122 may notify UE 110 of the HARQ DL and/or UL disablement. In some implementations, base station 122 may do so using an RRC message (e.g., an RRC Reconfiguration message). Additionally, or alternatively, base station 122 may use one or more of the IEs (e.g., a harq-disablement-DL IE, harq-disablement-UL IE, etc.) with corresponding values (e.g., a DRBId).

FIG. 6 is a diagram of examples 600 of MAC CEs for indicating, per logical channel identifier (LCID) enablement/disablement for HARQ processes. As shown, examples 600 may include a MAC CE for LCIDs of an UL shared channel (UL-SCH), which may include a first octet (OCT 1) comprising logical channel identifiers (LCG0, LCG1, etc.) and a second octet (OCT 2) comprising of indicators (0/1) of whether HARQ feedback is disabled/enabled on the corresponding logical channel. The notation 0/1 indicates disabled/enabled as 0 may indicate disabled and 1 may indicate enabled. Examples 600 also include a MAC CE for LCIDs of a DL-SCH, which may include a first octet (OCT 1) comprising logical channel identifiers (LCG0, LCG1, etc.) and a second octet (OCT 2) comprising of indicators (0/1) of whether HARQ feedback is disabled/enabled on the corresponding logical channel. The notation 0/1 indicates disabled/enabled as 0 may indicate disabled and 1 may indicate enabled. The MAC CEs of FIG. 6 may enable UE 110 to provide updates more frequently in scenarios where, for example, sufficient packet delay budget (PDB) limits may not remain on UE 110 for managing QoS and/or UE 110 flushes the data due to accumulated inherent delays.

Figure 7:
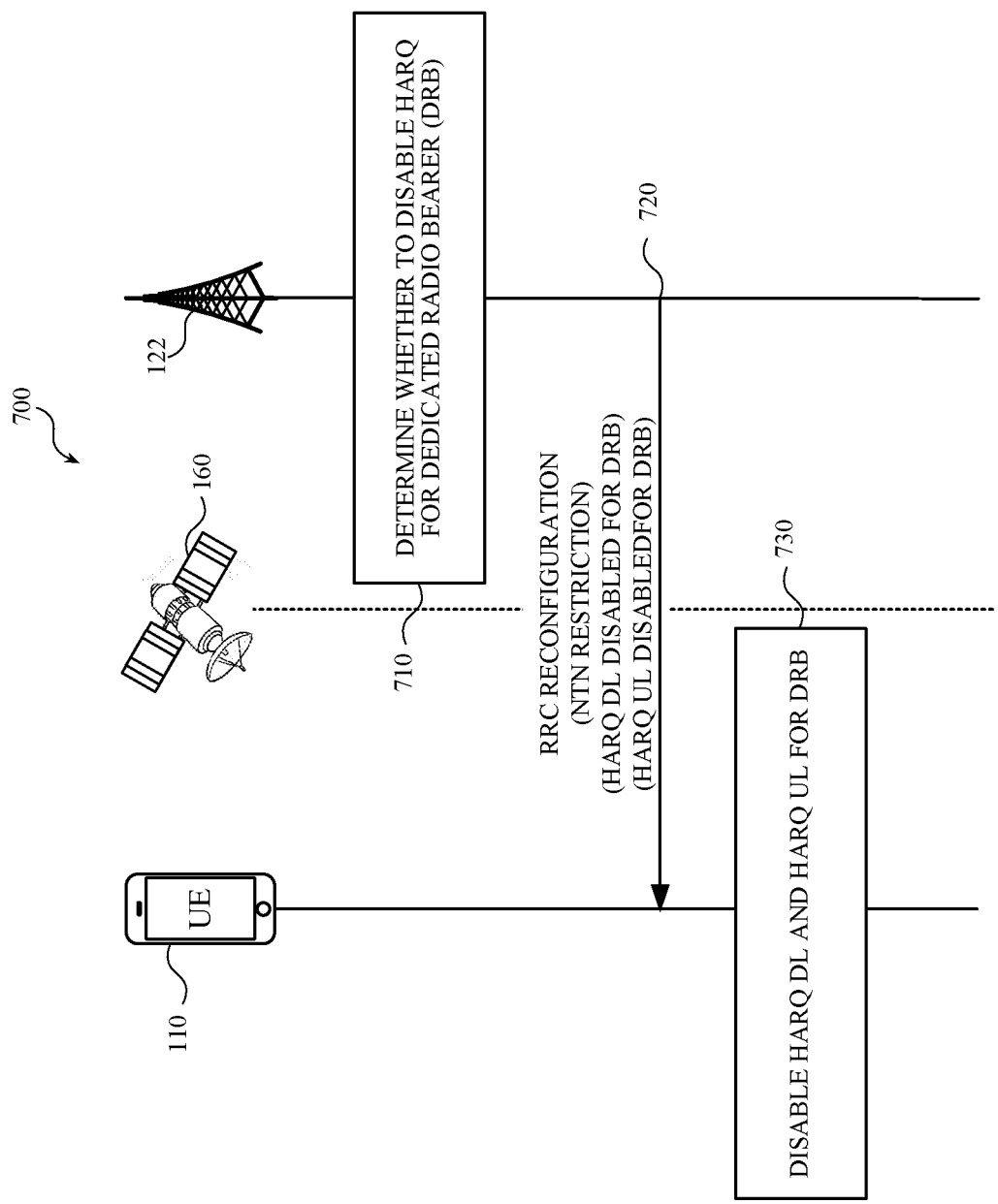
FIG. 7 is a diagram of an example of a process for disabling HARQ in an NTN per dedicated radio bearer (DRB).

FIG. 7 is a diagram of an example 700 of a process for disabling HARQ in an NTN per dedicated radio bearer (DRB). As shown, example 700 includes UE 110, base station 122, and satellite 160. In some implementations, some or all of example 700 may be performed by one or more other systems or devices, including one or more of the devices of FIG. 1. Additionally, example 700 may include one or more fewer, additional, differently ordered and/or arranged operations than those shown in FIG. 7. In some implementations, some or all of the operations of example 700 may be performed independently, successively, simultaneously, etc., of one or more of the other operations of example 700. As such, the techniques described herein are not limited to a number, sequence, arrangement, timing, etc., of the operations or process depicted in FIG. 7.

As shown, base station 122 may determine whether to disable HARQ for a DRB (at 710). For example, when a DRB is created, base station 122 may determine whether a QoS of the DRB falls within a pre-selected range of DRBs to have HARQ disabled. Additionally, or alternatively, when a DRB is created, base station 122 may determine whether a 5G QoS identifier (5QI) of the DRB corresponds to 5Q is selected, identified, or associated with HARQ disablement. When base station 122 determines that HARQ is to be disabled for the DRB, base station 122 may proceed by communicating an RRC reconfiguration message to UE 110 (at 720). The message may include one or more IEs to indicate the DRB to be added and HARQ information about the DRB. For example, the message may include a Radio-BearerConfig IE to define the new DRB. Additionally, or alternatively, the message may include an lcp-restriction-NTN IE with a value of "true" to indicate that the DRB is subject to restrictions. The message may also include a harq-disable-DL IE with a value of "true" to indicate that the disablement of HARQ DL for the DRB. The message may also include a harq-disable-UL IE with a value of "true" to indicate the disablement of HARQ UL for the DRB. In response to the message, UE 110 may disable HARQ DL and HARQ UL for the DRB (at 730).

In some implementations, example 700 may reduce the configurability options of enabling/disabling HARQ but may enable a cleaner end-to-end managed solution as HARQ feedback may more directly align with service delay designations of the DRB. Additionally, or alternatively, UE 110 may not be disposed to communicate back and forth (as frequently) regarding HARQ feedback states. Further, since enabling/disabling HARQ may be provided at the time of bearer setup, unnecessary signaling on an already expensive link (in terms of latency) may be avoided.

Figure 8:
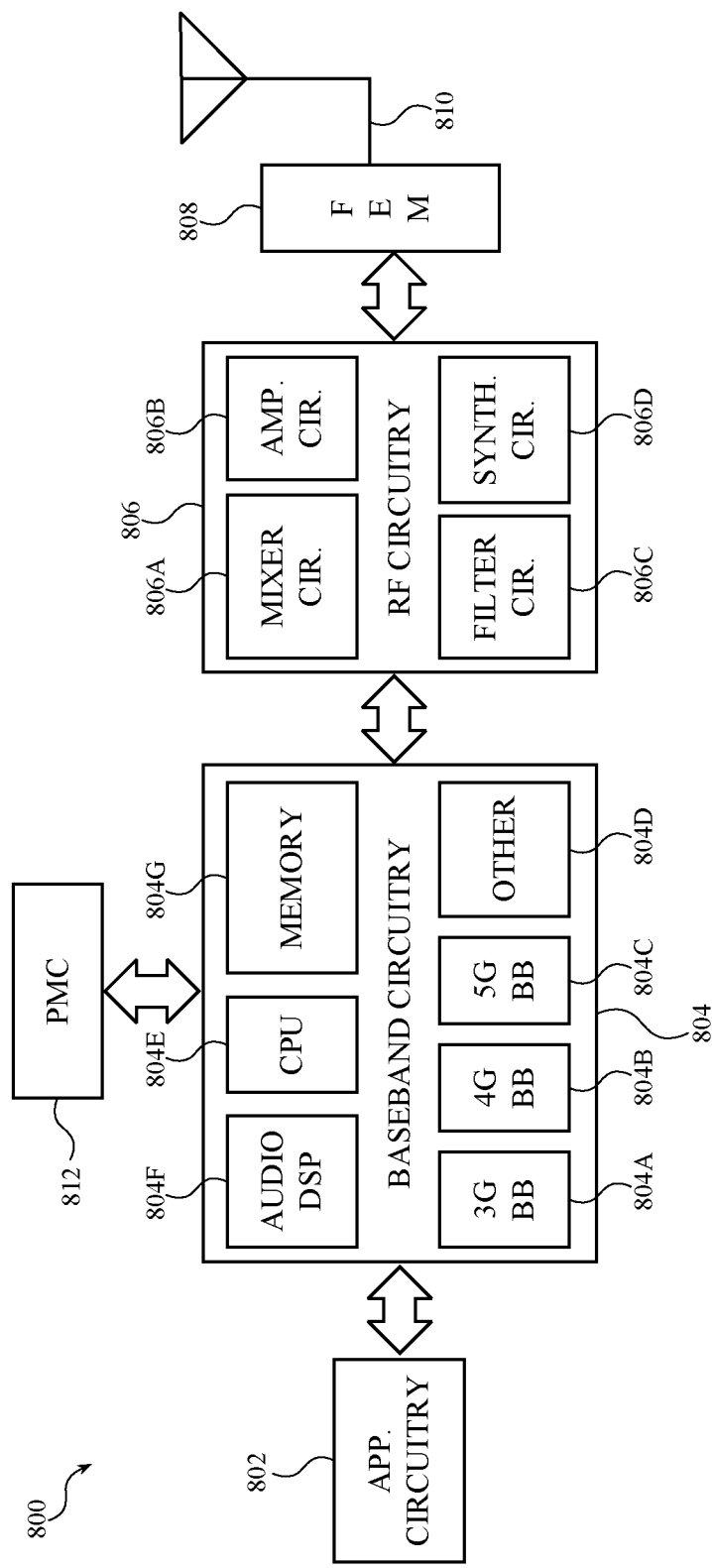
FIG. 8 is a diagram of an example of components of a device according to one or more implementations described herein.

FIG. 8 is a diagram of an example of components of a device according to one or more implementations described herein. In some implementations, the device 800 can include application circuitry 802, baseband circuitry 804, RF circuitry 806, front-end module (FEM) circuitry 808, one or more antennas 810, and power management circuitry (PMC) 812 coupled together at least as shown. The components of the illustrated device 800 can be included in a UE or a RAN node. In some implementations, the device 800 can include fewer elements (e.g., a RAN node may not utilize application circuitry 802, and instead include a processor/controller to process IP data received from a CN such as 5GC 130 or an Evolved Packet Core (EPC)). In some implementations, the device 800 can include additional elements such as, for example, memory/storage, display, camera, sensor (including one or more temperature sensors, such as a single temperature sensor, a plurality of temperature sensors at different locations in device 800, etc.), or input/output (I/O) interface. In other implementations, the components described below can be included in more than one device (e.g., said circuitries can be separately included in more than one device for Cloud-RAN (C-RAN) implementations).

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/ storage to enable various applications or operating systems to run on the device 800. In some implementations, processors of application circuitry 802 can process IP data packets received from an EPC.

The baseband circuitry 804 can include circuitry such as, but not limited to, one or more single-core or multi-core processors. The baseband circuitry 804 can include one or more baseband processors or control logic to process baseband signals received from a receive signal path of the RF circuitry 806 and to generate baseband signals for a transmit signal path of the RF circuitry 806. Baseband circuitry 804 can interface with the application circuitry 802 for generation and processing of the baseband signals and for controlling operations of the RF circuitry 806. For example, in some implementations, the baseband circuitry 804 can include a 3G baseband processor 804A, a 4G baseband processor 804B, a 5G baseband processor 804C, or other baseband processor(s) 804D for other existing generations, generations in development or to be developed in the future (e.g., 2G, 6G, etc.). The baseband circuitry 804 (e.g., one or more of baseband processors 804A-D) can handle various radio control functions that enable communication with one or more radio networks via the RF circuitry 806. In other implementations, some or all of the functionality of baseband processors 804A-D can be included in modules stored in the memory 804G and executed via a Central Processing Unit (CPU) 804E. The radio control functions can include, but are not limited to, signal modulation/demodulation, encoding/decoding, radio frequency shifting, etc. In some implementations, modulation/demodulation circuitry of the baseband circuitry 804 can include Fast-Fourier Transform (FFT), precoding, or constellation mapping/de-mapping functionality. In some implementations, encoding/decoding circuitry of the baseband circuitry 804 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 804 can include one or more audio digital signal processor(s) (DSP) 804F. The audio DSPs 804F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 804 and the application circuitry 802 can be implemented together such as, for example, on a system on a chip (SOC).

In some implementations, the baseband circuitry 804 can provide for communication compatible with one or more radio technologies. For example, in some implementations, the baseband circuitry 804 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various implementations, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some implementations, the receive signal path of the RF circuitry 806 can include mixer circuitry 806A, amplifier circuitry 806B and filter circuitry 806C. In some implementations, the transmit signal path of the RF circuitry 806 can include filter circuitry 806C and mixer circuitry 806A. RF circuitry 806 can also include synthesizer circuitry 806D for synthesizing a frequency for use by the mixer circuitry 806A of the receive signal path and the transmit signal path. In some implementations, the mixer circuitry 806A of the receive signal path can be configured to down-convert RF signals received from the FEM circuitry 808 based on the synthesized frequency provided by synthesizer circuitry 806D. The amplifier circuitry 806B can be configured to amplify the down-converted signals and the filter circuitry 806C can be a low-pass filter (LPF) or band-pass filter (BPF) configured to remove unwanted signals from the down-converted signals to generate output baseband signals. Output baseband signals can be provided to the baseband circuitry 804 for further processing. In some implementations, the output baseband signals can be zero-frequency baseband signals, although this is not a requirement. In some implementations, mixer circuitry 806A of the receive signal path can comprise passive mixers, although the scope of the implementations is not limited in this respect.

In some implementations, the mixer circuitry 806A of the transmit signal path can be configured to up-convert input baseband signals based on the synthesized frequency provided by the synthesizer circuitry 806D to generate RF output signals for the FEM circuitry 808. The baseband signals can be provided by the baseband circuitry 804 and can be filtered by filter circuitry 806C.

In some implementations, the mixer circuitry 806A of the receive signal path and the mixer circuitry 806A of the transmit signal path can include two or more mixers and can be arranged for quadrature down conversion and up conversion, respectively. In some implementations, the mixer circuitry 806A of the receive signal path and the mixer circuitry 806A of the transmit signal path can include two or more mixers and can be arranged for image rejection (e.g., Hartley image rejection). In some implementations, the mixer circuitry 806A of the receive signal path and the mixer circuitry 806A can be arranged for direct down conversion and direct up conversion, respectively. In some implementations, the mixer circuitry 806A of the receive signal path and the mixer circuitry 806A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode implementations, a separate radio IC circuitry can be provided for processing signals for each spectrum, although the scope of the implementations is not limited in this respect.

In some implementations, the synthesizer circuitry 806D can be a fractional-N synthesizer or a fractional N/N+1 synthesizer, although the scope of the implementations is not limited in this respect as other types of frequency synthesizers can be suitable. For example, synthesizer circuitry 806D can be a delta-sigma synthesizer, a frequency multiplier, or a synthesizer comprising a phase-locked loop with a frequency divider.

The synthesizer circuitry 806D can be configured to synthesize an output frequency for use by the mixer circuitry 806A of the RF circuitry 806 based on a frequency input and a divider control input. In some implementations, the synthesizer circuitry 806D can be a fractional N/N+1 synthesizer.

In some implementations, frequency input can be provided by a voltage controlled oscillator (VCO), although that is not a requirement. Divider control input can be provided by either the baseband circuitry 804 or the applications circuitry 802 depending on the desired output frequency. In some implementations, a divider control input (e.g., N) can be determined from a look-up table based on a channel indicated by the applications circuitry 802.

Synthesizer circuitry 806D of the RF circuitry 806 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 806D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 806 can include an IQ/polar converter.

FEM circuitry 808 can include a receive signal path which can include circuitry configured to operate on RF signals received from one or more antennas 810, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 810. In various implementations, the amplification through the transmit or receive signal paths can be done solely in the RF circuitry 806, solely in the FEM circuitry 808, or in both the RF circuitry 806 and the FEM circuitry 808.

In some implementations, the FEM circuitry 808 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 810).

In some implementations, the PMC 812 can manage power provided to the baseband circuitry 804. In particular, the PMC 812 can control power-source selection, voltage scaling, battery charging, or DC-to-DC conversion. The PMC 812 can often be included when the device 800 is capable of being powered by a battery, for example, when the device is included in a UE. The PMC 812 can increase the power conversion efficiency while providing desirable implementation size and heat dissipation characteristics.

While FIG. 8 shows the PMC 812 coupled only with the baseband circuitry 804. However, in other implementations, the PMC 812 may be additionally or alternatively coupled with, and perform similar power management operations for, other components such as, but not limited to, application circuitry 802, RF circuitry 806, or FEM circuitry 808.

In some implementations, the PMC 812 can control, or otherwise be part of, various power saving mechanisms of the device 800. For example, if the device 800 is in an RRC_Connected state, where it is still connected to the RAN node as it expects to receive traffic shortly, then it can enter a state known as Discontinuous Reception Mode (DRX) after a period of inactivity. During this state, the device 800 can power down for brief intervals of time and thus save power.

If there is no data traffic activity for an extended period of time, then the device 800 can transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 802 and processors of the baseband circuitry 804 can be used to execute elements of one or more instances of a protocol stack. For example, processors of the baseband circuitry 804, alone or in combination, can be used execute Layer 3, Layer 2, or Layer 1 functionality, while processors of the baseband circuitry 804 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 9:
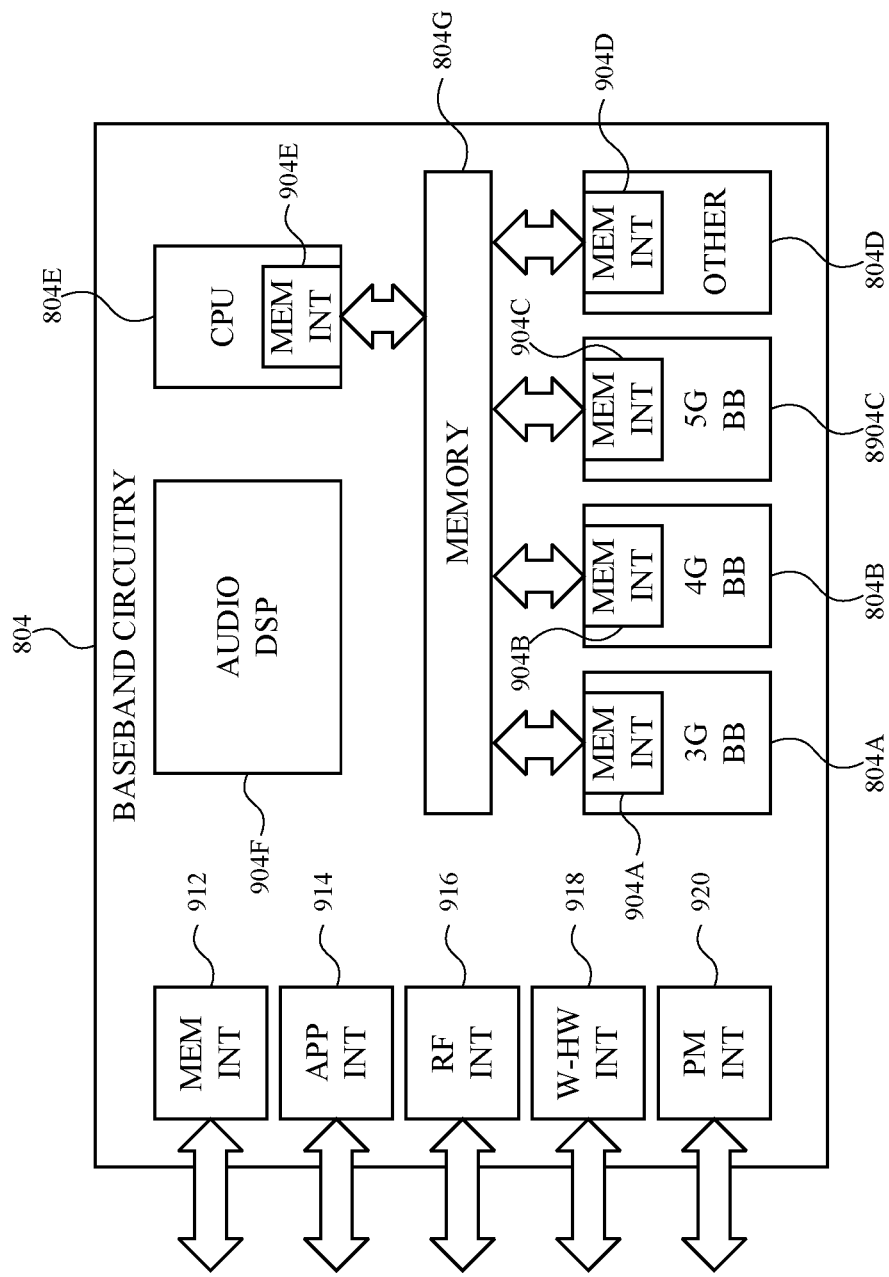
FIG. 9 is a diagram of example interfaces of baseband circuitry according to one or more implementations described herein.

FIG. 9 is a diagram of example interfaces of baseband circuitry according to one or more implementations described herein. As discussed above, the baseband circuitry 804 of FIG. 8 can comprise processors 804A-804E and a memory 804G utilized by said processors. Each of the processors 804A-804E can include a memory interface, 904A-904E, respectively, to send/receive data to/from the memory 804G.

The baseband circuitry 804 can further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a baseband processor of a user equipment (UE) may comprise one or more processors configured to: establish a connection with a non-terrestrial network (NTN); receive a request, from the NTN, for hybrid automatic repeat request (HARQ) disablement information, the HARQ disablement information comprising capabilities of the UE to communicate with the NTN without HARQ feedback; determine HARQ disablement information; communicate the HARQ disablement information to the NTN; and communicate with the NTN in accordance with the HARQ disablement information.

In example 2, the HARQ disablement information is communicated via a UE Capability Information radio resource control (RRC) message. In example 3, the HARQ disablement information comprises an lcp-Restriction-NTN information element (IE) indicating whether the UE supports HARQ disablement for logical channels indicated by an RRC message from the NTN. In example 4, the HARQ disablement information comprises an indication that the UE supports downlink (DL) HARQ disablement and uplink (UL) HARQ disablement. In example 5, the HARQ disablement information comprises a request for HARQ disablement.

In example 6, the HARQ disablement information comprises a UE Assistance Information RRC message that includes a request to disable HARQ. In example 7, the HARQ disablement information comprises an indication that the UE supports DL HARQ disablement and UL HARQ disablement for a dedicate radio bearer (DRB). In example 8, the one or more processors are configured to communicate with the NTN in accordance with the HARQ disablement information in response to receiving an RRC reconfiguration message, from the NTN, configuring HARQ disablement.

In example 9, the HARQ disablement information comprises MAC CEs configured to indicate DL HARQ disablement and UL HARQ disablement per logical channel identifier (LCID). In example 10, the one or more processors are further configured to communicate with the NTN in accordance with the HARQ disablement information in response to receiving a RRC reconfiguration message indicating DL HARQ disablement and UL HARQ disablement for a dedicated radio bearer (DRB). In example 11, the DRB corresponds to a quality of service (QoS) for which DL HARQ disablement and UL HARQ is disabled for NTN. In example 12, the RRC reconfiguration message includes a radio bearer configuration information element (IE) indicating the DRB.

In example, 13, a user equipment (UE) may be configured to: establish a connection with a non-terrestrial network (NTN); receive a request, from the NTN, for hybrid automatic repeat request (HARQ) disablement information, the HARQ disablement information comprising capabilities of the UE to communicate with the NTN without HARQ feedback; determine HARQ disablement information; communicate the HARQ disablement information to the NTN; and communicate with the NTN in accordance with the HARQ disablement information. In example 14, a method performed by a user equipment (UE) may comprise: establishing a connection with a non-terrestrial network (NTN); receiving a request, from the NTN, for hybrid automatic repeat request (HARQ) disablement information, the HARQ disablement information comprising capabilities of the UE to communicate with the NTN without HARQ feedback; determining HARQ disablement information; communicating the HARQ disablement information to the NTN; and communicating with the NTN in accordance with the HARQ disablement information.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to perform operations comprising:
   receiving a request, from a non-terrestrial network (NTN), for hybrid automatic repeat request (HARQ) disablement information, the HARQ disablement information indicating whether or not a user equipment (UE) is capable of communication with the NTN without HARQ feedback; and
   in response,
      determining HARQ disablement information;
      causing transmission of a message communicating the HARQ disablement information to the NTN; and
      controlling a transceiver to communicate with the NTN in accordance with the HARQ disablement information.

2. The baseband processor of claim 1, wherein the HARQ disablement information is communicated via a UE Capability Information radio resource control (RRC) message.

3. The baseband processor of claim 1, wherein the HARQ disablement information comprises an lcp-Restriction-NTN information element (IE) indicating whether the UE supports HARQ disablement for logical channels indicated by an RRC message from the NTN.

4. The baseband processor of claim 1, wherein the HARQ disablement information comprises an indication that the UE supports downlink (DL) HARQ disablement and uplink (UL) HARQ disablement.

5. The baseband processor of claim 1, wherein the HARQ disablement information comprises a request for HARQ disablement.

6. The baseband processor of claim 1, wherein the HARQ disablement information comprises a UE Assistance Information RRC message that includes a request to disable HARQ.

7. The baseband processor of claim 1, wherein the HARQ disablement information comprises an indication that the UE supports DL HARQ disablement and UL HARQ disablement for a dedicate radio bearer (DRB).

8. The baseband processor of claim 1, wherein the operations comprise communicating with the NTN in accordance with the HARQ disablement information in response to receiving an RRC reconfiguration message, from the NTN, configuring HARQ disablement.

9. The baseband processor of claim 1, wherein the HARQ disablement information comprises MAC CEs configured to indicate DL HARQ disablement and UL HARQ disablement per logical channel identifier (LCID).

10. The baseband processor of claim 1, wherein the operations further comprise communicating with the NTN in accordance with the HARQ disablement information in response to receiving a radio resource control (RRC) reconfiguration message indicating DL HARQ disablement and UL HARQ disablement for a dedicated radio bearer (DRB).

11. The baseband processor of claim 10, wherein the DRB corresponds to a quality of service (QoS) for which DL HARQ disablement and UL HARQ is disabled for NTN.

12. The baseband processor of claim 10, wherein the RRC reconfiguration message includes a radio bearer configuration information element (IE) indicating the DRB.

13. A user equipment (UE), configured to:
   receive a request, from a non-terrestrial network (NTN), for hybrid automatic repeat request (HARQ) disablement information, the HARQ disablement information indicating whether or not a user equipment (UE) is capable of communication with the NTN without HARQ feedback; and
   in response,
      determine HARQ disablement information;
      transmit a message communicating the HARQ disablement information to the NTN; and
      communicate with the NTN in accordance with the HARQ disablement information.

14. The UE of claim 13, wherein the HARQ disablement information is communicated via a UE Capability Information radio resource control (RRC) message.

15. The UE of claim 14, wherein the HARQ disablement information comprises an lcp-Restriction-NTN information element (IE) indicating whether the UE supports HARQ disablement for logical channels indicated by an RRC message from the NTN; and wherein the HARQ disablement information further comprises an indication that the UE supports downlink (DL) HARQ disablement and uplink (UL) HARQ disablement.

16. The UE of claim 13, wherein the HARQ disablement information comprises a UE Assistance Information RRC message that includes a request to disable HARQ and the HARQ disablement information further comprises an indication that the UE supports DL HARQ disablement and UL HARQ disablement for a dedicate radio bearer (DRB).

17. A method performed by a user equipment (UE), comprising:
   establishing a connection with a non-terrestrial network (NTN);
   receiving a request, from a non-terrestrial network (NTN), for hybrid automatic repeat request (HARQ) disablement information, the HARQ disablement information indicating whether or not a user equipment (UE) is capable of communication with the NTN without HARQ feedback; and
   in response,
      determining HARQ disablement information;

transmitting a message communicating the HARQ disablement information to the NTN; and communicating with the NTN in accordance with the HARQ disablement information.

18. The method of claim 17, further comprising:

communicating with the NTN in accordance with the HARQ disablement information in response to receiving a RRC reconfiguration message indicating DL HARQ disablement and UL HARQ disablement for a dedicated radio bearer (DRB).

19. The method of claim 18, wherein the DRB corresponds to a quality of service (QoS) for which DL HARQ disablement and UL HARQ is disabled for NTN.

20. The method of claim 19, wherein the RRC reconfiguration message includes a radio bearer configuration information element (IE) indicating the DRB.

* * * * *